United States Patent
Fischer et al.

(10) Patent No.: US 7,255,732 B2
(45) Date of Patent: Aug. 14, 2007

(54) BIODEGRADABLE POLYMER MATERIAL CONSISTING OF STARCH AND DIALDEHYDE POLYSACCHARIDE

(75) Inventors: Sabine Fischer, Mierlo (NL); Eric G. M. Craenmehr, Venlo (NL); Jan J. De Vlieger, Eindhoven (NL); Theodoor M. Slaghek, Rotterdam (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 10/529,228

(22) PCT Filed: Sep. 29, 2003

(86) PCT No.: PCT/NL03/00662

§ 371 (c)(1),
(2), (4) Date: Feb. 23, 2006

(87) PCT Pub. No.: WO2004/029147

PCT Pub. Date: Apr. 8, 2004

(65) Prior Publication Data

US 2007/0006875 A1    Jan. 11, 2007

(30) Foreign Application Priority Data

Sep. 27, 2002   (NL) .................................. 1021548

(51) Int. Cl.
  *C08L 5/00*   (2006.01)
  *C08L 3/04*   (2006.01)
  *C08L 3/10*   (2006.01)
  *C08J 3/05*   (2006.01)

(52) U.S. Cl. ............................... 106/208.1; 106/208.4; 106/208.5; 524/49

(58) Field of Classification Search ............. 106/208.1, 106/208.4, 208.5; 524/49
See application file for complete search history.

(56) References Cited

U.S. PATENT DOCUMENTS

| | | | | |
|---|---|---|---|---|
| 6,313,105 B1 * | 11/2001 | Bengs et al. | ................... | 514/60 |
| 6,406,530 B1 * | 6/2002 | Bengs et al. | ............. | 106/137.1 |
| 6,565,640 B1 * | 5/2003 | Bengs et al. | ............. | 106/209.1 |
| 6,811,599 B2 * | 11/2004 | Fischer et al. | ......... | 106/287.17 |

FOREIGN PATENT DOCUMENTS

| | | |
|---|---|---|
| EP | 0 599 535 A | 6/1994 |
| EP | 0 599 535 A1 | 6/1994 |
| WO | 90 05161 A | 5/1990 |
| WO | WO 90/05161 | 5/1990 |
| WO | 93 19125 A | 9/1993 |
| WO | WO 93/19125 | 9/1993 |
| WO | 99 02596 A | 1/1999 |
| WO | 99 02599 A | 1/1999 |
| WO | WO 99/02596 | 1/1999 |
| WO | WO 99/02599 | 1/1999 |

* cited by examiner

Primary Examiner—David M. Brunsman
(74) Attorney, Agent, or Firm—Nixon & Vanderhye P.C.

(57) ABSTRACT

Starch can be gelatinised more efficiently by a thermomechanical treatment, if a dialdehyde polysaccharide with a relatively low degree of oxidation is added to the starch. This thermomechanical treatment can be carried out at a temperature below 115 DEG C., or even below 100 DEG C., and with a high throughput rate. With this treatment a granulate or other semi-finished product is obtained that can be shaped to produce an article that has excellent dimensional stability in water. By adding dialdehyde polysaccharide with a low degree of oxidation to starch it is possible to blow transparent films based on thermoplastic starch which have improved mechanical properties.

16 Claims, No Drawings

BIODEGRADABLE POLYMER MATERIAL CONSISTING OF STARCH AND DIALDEHYDE POLYSACCHARIDE

This application is the US national phase of international application PCT/NL2003/000662 filed 29 Sep. 2003 which designated the U.S. and claims priority of NL 1021548, filed 27 Sep. 2002, the entire contents of each of which are hereby incorporated by reference.

The invention relates to a starch formulation that promotes gelatination by thermomechanical treatment.

Thermoplastic starch has proved suitable as a material for the production of biodegradable mouldings, such as packaging material. Apart from biodegradability, starch has the advantage that it is available from an inexhaustible source, in contrast to more common materials, such as those based on fossil hydrocarbons.

Starch has to be rendered thermoplastic for processing to mouldings. For this purpose the crystal structure of starch must be broken by gelatination. A temperature treatment in the presence of water is usually needed for gelatination. Gelatination is often combined with a thermomechanical treatment. Extrusion is a suitable process for this. A plasticiser is needed in the thermoplastic processing of starch. Water itself acts as a plasticiser, but usually supplementary plasticisers, such as glycerol or urea, are used for efficient process control.

A disadvantage of the known methods is that relatively high temperatures, above 120° C., and large amounts of plasticiser (more than 50% (m/m), based on the dry starch) are needed for the continuous thermomechanical treatment of the starch, which has the result that the mechanical properties decrease with increasing plasticiser concentration.

Moreover, the processing of starch is more difficult, and in particular slower, than the processing of the polyolefins usually used, such as PE. The production rate of an extruder is 2.5 times lower with starch than with PE.

Another disadvantage of these thermoplastic starch products is their high sensitivity to water. Consequently, they cannot be used as packaging material for many applications.

In WO 99/02599 it is proposed to add 5-30% dialdehyde starch (DAS) to starch in order to improve the water resistance of the end product formed. DAS has a degree of oxidation of 70-95% in this case.

It has now been found that the addition of dialdehyde polysaccharide (DAP) has a beneficial effect on the continuous processing of the starch. Even small amounts of DAP allow an appreciable lowering of the extrusion temperature and the capacity of the extruder is appreciably increased. In this context it has been found that a high degree of oxidation (DO) of the DAP is not needed, but that DAP with a low degree of oxidation (even one of 2-5%) also has a beneficial effect on the processing; that is to say, the processing procedure proceeds more efficiently and with a lower energy consumption than without the addition of DAP. Furthermore, it has been found that even in the case of the addition of a DAP with a low degree of oxidation (2-60%) to thermoplastic starch, the end product is dimensionally stable in water. Surprisingly, a lower degree of oxidation than that according to WO 99/02599 is also found to be associated with a better tensile strength (higher modulus). A cross-linking agent (glyoxal and the like), such as is used according to WO 99/02599, is not needed in this case.

The process according to the invention is therefore characterised in that a dialdehyde polysaccharide is added to the starch to be rendered thermoplastic and the thermo-mechanical treatment is carried out at a temperature of 115° C. or lower. The thermo-mechanical treatment is, in particular, a continuous treatment, such as extrusion.

The starch that is gelatinised according to the process can be any type of starch, for example originating from potatoes, maize, cassava, etc. It can also be starch with a raised amylose content or, specifically, a raised amylopectin content, optionally produced by recombinant organisms. The starch can be mixed with any other naturally occurring polymer (biopolymer) that can be thermoplastically processed separately from or together with starch, such as cellulose, chitosan, alginate, other microbial or vegetable gums, pectin, gelatine, polylysine, casein or other proteins. Modified starch and modified forms of the other naturally occurring polymers can also be present. Preferably, the percentage of starch in the total amount of biopolymer is at least 30% (m/m), in particular at least 80% (m/m).

The dialdehyde polysaccharide (DAP) can be derived from any polysaccharide, such as starch, cellulose, other glucans, (arabino)galactans, (galacto- or gluco-)mannans, inulin and other gums. It can be obtained from the polysaccharides by oxidation with, for example, periodate, 1,2-dihydroxyethylene groups being oxidised to two aldehyde groups with cleavage of the monose ring. The periodate oxidation is generally known and is, for example, described in WO 95/12619. The DAP can have a wide range of molecular weights, for example from approximately 1,500 Da to approximately $10^7$ Da. Some of the aldehyde groups of the dialdehyde polysaccharide can have been further oxidised to carboxylic acid groups, as in the products according to WO 00/26257. Preferably, the number of carboxylic acid groups is no higher than the number of aldehyde groups, that is to say at most one of the two aldehyde groups per (C2-C3)-dialdehyde group has been further oxidised to a carboxyl group.

The dialdehyde content of the polysaccharide can range from a degree of oxidation (DO) of, for example, 0.02 (2%) to virtually 1.0(100%). The degree of oxidation of dialdehyde polysaccharides is understood to be the fraction of the sugar units in which the dihydroxyethylene group has been converted to two aldehyde groups. In addition to the dialdehyde group, the polysaccharide may also contain other functional groups, such as hydroxyalkyl groups, cationic groups, carboxyl groups and other acid groups. Preferably, a DO to dialdehyde groups of 2-65% or preferably 3-60%, more preferentially of 4-40% and most preferentially of 5-30%, especially 5-25%, is used. In general, the amount of DAP can be reduced with an increasing DO. Preferably, the DAP used is dialdehyde starch (DAS). DAS is available commercially.

An appreciable improvement in gelatination is already obtained with an amount of 2% (m/m) DAP (based on the dry starch) and in particular from 5% (m/m). Furthermore, it has been demonstrated that addition of small amounts of DAP appreciably improves the viscosity of the melt, so that the processing of starch is promoted. Amounts of more than 50% can certainly be used, for example up to 75%, but result in no further significant improvement in processing. Most preferentially, 10-25% (m/m) DAP is used.

Water is the most effective plasticiser for starch. The amount of water relative to starch is 5-80%, that is to say 5-80 g water per 100 g dry starch or starch/biopolymer mixture, preferably 15-70% and more preferentially 30-60% (m/m).

For the long-term stability of the thermoplastic end product yet further plasticisers have to be added. This is because if water is added to starch as the sole plasticiser, the water is able to diffuse away in the course of time, as a result of which the material becomes brittle. Various other plasticisers for starch are known, such as hydroxy compounds or polyols (such as glycol, di- and polyglycol, glycerol, erythritol, pentaerythritol, sorbitol, other sugar alcohols, gluconic acid, etc.), partial esters thereof, amide compounds (such as urea) and metal carboxylates (such as sodium lactate). The amount of other plasticiser, based on the dry starch or starch/biopolymer mixture, is preferably 10-75% (m/m), more preferentially 15-50% (m/m) and in particular 20-45% (m/m). The percentage of plasticisers that is needed for gelatinising starch can already be reduced by adding small amounts of DAP.

Clay minerals can also be added to the mixture—of starch or starch/biopolymer mixture with DAP and plasticisers, one of which is water—to be extruded, as described in WO 01/68762. The clay minerals concerned are preferably montmorillonite, saponite, hectorite and other minerals of the smectite type. The amount of clay particles can vary from, for example, 1-50% (m/m), and in particular 2-10% (m/m), based on the dry weight of the starch (and any other biopolymers). The addition of clay leads to an improvement in the mechanical and gas barrier properties of the end product.

In addition to naturally occurring polymers, biodegradable synthetic polyesters can be added to the mixture, for example the polyesters as described in U.S. Pat. No. 6,348,524, in particular polycaprolactone, polylactate, polyhydroxyacetate and polyhydroxybutyrate, polyethylene succinate, polybutylene succinate and the like, as well as copolymers and mixtures thereof. The amount of polyester can, for example, be between 10 and 80% (m/m) of the amount of dry starch. The polyester can be blended directly with the extrudate, but—if used—is preferably added in the course of the process, for example at a point halfway through the extrusion.

Depending on the application of the end product, additives such as pigments, stabilisers, processing agents, flavours and fragrances, and also anti-fouling agents or release retarders, can also be added.

The thermomechanical treatment is preferably carried out in the form of extrusion in a twin-screw extruder and at temperatures of 70-170, advantageously below 115° C., preferably at 80-100° C. The temperatures mentioned here refer to the actual temperatures in the extruder. High shear forces during the extrusion to break the starch crystal structure, such as are customary in present day production of thermoplastic starch, have become superfluous as a result of the use of water as plasticiser and as a result of the addition of a dialdehyde polysaccharide. By this means the processing of biopolymers to give a thermoplastic material becomes distinctly energy-saving and the production rate is increased at the same time.

In principle, discontinuous thermomechanical treatment is also possible, but has the disadvantage of a lower productivity. The advantages of the invention are best revealed in a continuous process.

With the thermomechanical treatment semi-finished products in the form of granulates, sheets, films or other forms that can be processed are produced. These thermoplastic products must be stored for at least 3 hours immediately after extrusion to reach a thermodynamically stable equilibrium and to obtain a completely water-resistant product. Storage can best take place in a closed box or bag, but also in an open store if the atmospheric humidity is not less than 50% RH. These thermoplastic semi-finished products can be further processed in a known thermomechanical manner to give shaped articles by means of injection moulding, foaming, film casting, deep drawing, film blowing, film pressing and the like.

The invention also relates to the intermediate product that can be obtained by the process described above, in particular a granulate, powder, film, etc., and to the shaped end product that can be obtained from this intermediate product. The granulate of thermoplastic starch as obtained according to the invention can be processed to give hot-pressed films and further processed by means of film blowing. Other shaping steps, such as injection moulding or thermoforming, can also be employed. The end product can, in particular, be a blown film, which in addition to the starch and dialdehyde polysaccharide and any other biopolymers and plasticisers can contain 10-80, in particular 10-40% (m/m) polyester.

EXAMPLE 1

Using a Hobart N-50 mixer, 1205 g native potato starch (contains 10% moisture) was mixed with 753 g dialdehyde starch (DAS) with DO 20% (contains 64% moisture) and 542 g glycerol. The ratio in the premix is:starch:DAS:water:glycerol=80:20:45:40. The premix was processed using a twin-screw co-rotating extruder (L/D=11) at 80° C. and 200 rpm. The product throughput in the extruder is at most 3.24 kg/h. The extrudate is homogeneous, transparent and flexible. The extrudate is completely gelatinised —100% amorphous. Gelatination was determined using a polarisation optical microscope (POM). No granules of native starch are discernible in a POM photograph. The samples are still completely dimensionally stable after 5 hours in water (20° C).

Various mixtures (differences in amount of DAS, starch and plasticiser and with different degrees of oxidation) were produced in the above manner and extruded under the same conditions and tested to determine gelatination and stability to water; see Table 1.

TABLE 1

| Sample number | Degree of oxidation DAS | Composition of premix (pph) | | | | Gelatination (%) | Dimensional stability in water* |
|---|---|---|---|---|---|---|---|
| | | Starch | DAS | Water | Glycerol | | |
| 1 | 5 | 90 | 10 | 40 | 40 | 100 | + |
| 2 | 5 | 95 | 5 | 40 | 40 | 100 | + |
| 3 | 5 | 80 | 20 | 40 | 40 | 100 | + |
| 4 | 5 | 90 | 10 | 40 | 45 | 100 | + |
| 5 | 10 | 90 | 10 | 40 | 40 | 100 | + |
| 6 | 10 | 90 | 10 | 40 | 45 | 100 | + |
| 7 | 20 | 90 | 10 | 40 | 40 | 100 | + |
| 8 | 20 | 50 | 50 | 40 | 40 | 100 | + |
| 9 | 30 | 90 | 10 | 40 | 40 | 100 | + |
| 10 | 30 | 90 | 10 | 45 | 40 | 100 | + |

*+ = samples still completely dimensionally stable after 5 hours in water (20° C.)

EXAMPLE 2 (COMPARISON)

Using a Hobart N-50 mixer, 901 g native potato starch (contains 10% moisture) was mixed with 275 g water and 324 g glycerol. The ratio of the premix is:starch:DAS:water:glycerol=100:0:45:40. The premix was processed using a twin-screw co-rotating extruder (L/D=11) at 100° C. and 200 rpm. The product throughput in the extruder was at most 1.77 kg/h. The extrudate is homogeneous and flexible. The product is white/opaque because it has hardly gelatinised.

Gelatination was determined using POM. A very large number of granules of native starch are visible in a POM photograph. After storage, the granulate is dimensionally stable in water at room temperature.

Various mixtures (differences in amounts of plasticiser) were produced in the same manner without DAP and extruded at various extrusion temperatures at 200 rpm in the twin-screw extruder and tested to determine gelatination and stability to water; see Table 2.

TABLE 2

| Sample number | Composition of premix (pph) | | | | Extrusion temp. (° C.) | Gelatination (%) | Dimensional stability in water* |
|---|---|---|---|---|---|---|---|
| | Starch | DAS | Water | Glycerol | | | |
| B1 | 100 | 0 | 45 | 40 | 130 | 100 | + |
| B2 | 100 | 0 | 40 | 45 | 100 | 15 | + |
| B3 | 100 | 0 | 40 | 45 | 130 | 95 | + |
| B4 | 100 | 0 | 40 | 40 | 130 | 95 | + |
| B5 | 100 | 0 | 40 | 40 | 140 | 100 | + |

*+ = samples are still completely dimensionally stable after 5 hours in water (20° C.)

EXAMPLE 3

Using a Hobart N-50 mixer, 302 g native potato starch (contains 10% moisture) was mixed with 59 g DAS with DO 5% (contains 49% moisture), 81 g chitosan solution (1.5% solids) and 60 g glycerol. The ratio of the premix is:starch:DAS:water:glycerol:chitosan=90:10:45:20:0.4. The premix was processed using a twin-screw co-rotating extruder (L/D=11) at 110° C. and 200 rpm. The product throughput in the extruder is at most 3.15 kg/h. The extrudate is homogeneous, transparent and flexible. The extrudate is completely gelatinised. Gelatination was determined using POM. After storage, all samples are completely dimensionally stable in water at room temperature.

EXAMPLE 4

Using a Hobart N-50 mixer, 266 g native potato starch (contains 10% moisture) was mixed with 52 g DAS with DO 5% (contains 49% moisture), 21 g clay (sodium bentonite from Laviosa, CEC 110 meq/100 g clay), 54 g water and 106 g glycerol. The ratio of the premix is:starch:DAS:clay:water:glycerol=90:10:8:40:40. The premix was processed using a twin-screw co-rotating extruder (L/D=11) at 100° C. and 200 rpm. The extrudate is completely gelatinised. Gelatination was determined using POM. After storage, all samples are completely dimensionally stable in water at room temperature.

EXAMPLE 5

Using a Hobart N-50 mixer, 488 g native potato starch (contains 18% moisture) was mixed with 50 g C2C3-dialdehyde of gum arabic (DAGA) with DO 10% (contains 11% moisture), 84 g water and 178 g glycerol. The ratio of the premix is:starch:DAGA:water:glycerol=90:10:40:40. The premix was processed using a twin-screw co-rotating extruder (L/D=11) at 100° C. and 200 rpm. The extrudate is completely gelatinised. Gelatination was determined using POM. After storage, all samples are dimensionally stable in water at room temperature.

EXAMPLE 6

Hot-pressed films were made using a press from Fontijne. A few grams of granulate were placed between two PET sheets which were sandwiched between two stainless steel mirror plates. Pressing was carried out for 30 seconds at 50-200 kN at a temperature of 120-150° C., after which cooling to 90° C. was carried out under the same pressure.

EXAMPLE 7

Cast films were made with the aid of a Collin single-screw extruder at 110° C. The extrusion nozzle is in the shape of a small horizontal slit. The sheet obtained passes through a four-roller calender. The sheets have a thickness of 1-1.5 mm.

EXAMPLE 8

Film blowing was carried out in the same extruder as that used to make granulate. However, the extrusion nozzle of the extruder was replaced by a blowing head. The temperature was set at a maximum of 110° C. and the speed of revolution at 100 rpm. The film-blowing process on granulate from the samples from Examples 1, 3, 4 and 5 gave good results. The films have a thickness of less than 100 μm and are completely transparent. In contrast, it was not possible to blow any good films from the granulate from the samples from Example 2 (thermoplastic starch without DAP). The melt viscosity of samples without DAP is too poor to make good blown films even at a higher processing temperature. The melt that issues from the blowing head hardly expands and forms a blown column of small diameter (diameter is only 2-4 cm larger than the opening of the blowing head); the films produced are matt and have a thickness of 100-300 μm.

All end products (Examples 6-8) are completely dimensionally stable in water, that is to say, if these products are placed in a water bath (20° C.) for a minimum of 1 day, visually there is no deterioration in the dimensional stability of these products to be found. They do not become soft or white.

Mechanical tests on the films have shown that the Young's modulus and the tensile strength of the films containing DAP are improved compared with films without DAP. Addition of clay to the films containing DAP leads to a further improvement in the mechanical properties.

The invention claimed is:

1. A process of gelatinising starch by thermomechanical treatment of starch, wherein a dialdehyde polysaccharide with a degree of oxidation of 2-65% is added to the starch and the thermomechanical treatment is carried out continuously.

2. A process according to claim 1, wherein the water content of the starch at the start of the thermomechanical treatment is 5-80% (m/m), based on the starch.

3. A process according to claim 1, wherein 2-50% (m/m) (based on dry starch) of dialdehyde polysaccharide is used.

4. A process according to claim 1, wherein the thermomechanical treatment comprises extrusion.

5. A process according to claim 4, wherein a dialdehyde polysaccharide with a degree of oxidation of 3-60%, is used.

6. A process according to claim 4, wherein a dialdehyde polysaccharide with a degree of oxidation of 5-30% is used.

7. A process according to claim 1, wherein 10-75% (m/m) of one or more plasticisers other than water is also added to the starch.

8. A process according to claim 1, wherein the dialdehyde polysaccharide is dialdehyde starch.

9. A process according to claim 1, wherein 1-50% (m/m) clay mineral is also added to the starch.

10. A process according to claim 1, wherein one or more other biopolymers are added to the starch, in a ratio of 1-70% based on the total of biopolymers.

11. A process according to claim 1, wherein 10-80% (m/m) (based on the starch) aliphatic polyester is also added to the starch.

12. A process according to claim 1, wherein the thermomechanical treatment is carried out at a temperature below 115C.

13. A process according to claim 1, wherein the thermomechanical treatment is carried out at a temperature of 80-100 C.

14. A granulate of thermoplastic starch that, based on the starch, contains 2-50% (m/m) of a dialdehyde polysaccharide or coupling product thereof, with a degree of oxidation of 3-65%, and 10-75% (m/m), based on the total of starch and dialdehyde polysaccharide, of a polyol or urea as plasticiser, and water.

15. A shaped starch product that, based on the starch, contains 2-50% (m/m) of a dialdehyde polysaccharide or coupling product thereof, with a degree of oxidation of 3-65% and 10-75% (m/m), based on the total of starch and dialdehyde polysaccharide, of a polyol or urea as plasticiser, and water.

16. A blown starch film that, based on the starch, contains 2-50% (m/m) of a dialdehyde polysaccharide or coupling product thereof, with a degree of oxidation of 2-65%, and 10-75% (m/m), based on the total of starch and dialdehyde polysaccharide, of a polyol or urea as plasticiser, and water.

* * * * *